Patented June 5, 1923.

1,457,581

UNITED STATES PATENT OFFICE.

BARTHOLOMEW C. LEONARDI, OF NEW ROCHELLE, NEW YORK, ASSIGNOR TO GEORGE D. WRIGHT CORPORATION, OF NEW YORK, N. Y., A CORPORATION OF DELAWARE.

ART OF DYEING.

No Drawing.    Application filed February 23, 1922. Serial No. 538,819.

*To all whom it may concern:*

Be it known that I, BARTHOLOMEW C. LEONARDI, a citizen of the United States, and residing at New Rochelle, in the county of Westchester and State of New York, have invented certain new and useful Improvements in the Art of Dyeing, of which the following is a specification.

This invention relates to the art of dyeing, and has for an object to provide a composition that is self-contained, is completely soluble in water, and that will produce upon the goods to be dyed a uniform clear color, and free from "spots."

A further object is to provide a composition that contains the required coloring agents, mordants and levelling agents (the latter sometimes called restraining, retarding, resisting, and inhibiting agents), and also fixing agents necessary to complete the dyeing operation.

The composition consists of finely divided and thoroughly dried and mixed powders in proportions suitable for the work required. The components of the composition will also vary with the character of material to be dyed, that is, of either animal or vegetable origin, as silk, wool, cotton, linen, etc.

A composition suitable for dyeing animal fibres would contain a developer, to set free its coloring agent from the acid or basic color. Suitable developers are tartaric acid, oxalic acid, citric acid, etc., which are normally solid acids, which may be present in quantity sufficient to give the resulting dye bath either an acid reaction with acid dyes, or an acid or neutral reaction with basic dyes. Of the above, tartaric acid is preferred.

The composition would also contain suitable mordants, such as chromium sulphate, chrome alum, or aluminum sulphate.

The composition would also contain a levelling agent, sometimes called restraining, retarding, resisting, or inhibiting agents, to control the rapidity of the union of coloring matter with the fibre, thereby producing a more uniform or level dyeing or coloring, and increasing the depth of penetration of the color in the fibre. Suitable agents for this purpose are anhydrous sodium phosphate or anhydrous sodium sulphate, singly or combined.

The composition would also contain a fixing agent for the purpose of fixing the mordants upon the fiber in a more or less insoluble state, thereby increasing the fastness of the color to the influences of light, atmosphere, perspiration, washing with boiling soap and water, etc. A suitable fixing agent is sodium bicarbonate and in certain cases, tannic acid.

The composition would also contain a soluble filler to increase the degree of comminution of the coloring matter, by providing an enormously increased surface to support a given quantity of color, thereby reducing the time required for the solvent action of the water in the preparation of the dye bath. A suitable filler is a sugar of animal origin, such as sugar of milk, or milk sugar (also called lactose).

For vegetable fibres, instead of the mordants above referred to, there may be used tannic acid, or gallic acid, or similar mordants, but I prefer tannic acid.

Examples of suitable acid dyes are:—azo eosine; XL fuchsine; orange II; fast acid yellow; fast yellow; erio cyanine; azo acid blue; acid violet 4R; erio violet RL; etc.

Examples of suitable basic dyes are:— magenta pyranine red; malachite green; Bismarck brown; nigrosine; etc.

Examples of direct or substantive colors are:—dongola red; erica; decuze fast orange; ora blue; dianine black; etc.

For dyeing silks, a "tint" is used, tints being less concentrated than dyes. Such acid or basic colors are used, or combinations of them, that will dye the silk, but will not dye vegetable fibres.

For animal fibres, such as wool, the dye is more concentrated, and direct or substantive colors, for example, such as those above indicated, are combined with the acid or basic colors to bring them to a desired shade.

A suitable composition for silk tinting is as follows:—

|  | Grains. |
|---|---|
| Color | 1 to 5 |
| Tartaric acid | 5 to 30 |
| Sodium sulphate | 10 to 50 |
| Aluminum sulphate | 15 to 60 |
| Sodium bicarbonate | 30 to 60 |
| Lactose | 60 to 120 |
|  | 121 to 325 |

The above substances, in quantities varying with conditions of color, intensity of tint, character of silk to be tinted, etc., are sufficient for a pound of silk. The composition is to be completely dissolved in from one gallon to three gallons of water at a temperature of from 120 degrees to 160 degrees F., or as hot as one can keep one's hand in. This solution will tint silk goods, but will not color cotton or linen goods, such as lace or other trimmings, attached to the silk.

For an "all purpose dye" the following composition will be found satisfactory:

|  | Grains. |
|---|---|
| Color | from 70 to 350 |
| Sodium sulphate | from 60 to 300 |
| Aluminum sulphate | from 120 to 480 |
| Lactose | from 60 to 300 |

This quantity of "all purpose" mixture will dye one pound of goods, and is to be dissolved in from three to five gallons of water, the amount of coloring matter used depending upon the strength and purity of color, and the depth and character of shade it is desired to produce. The composition to be completely dissolved in water at from 160 degrees to 212 degrees F., the dyeing operation to be carried out at these temperatures, which will vary with the character of fibre to be dyed.

For "all purpose" work, substantive or direct colors are used, toned when necessary with basic colors. The quantities of color used will vary with the work to be done, from two per cent to the weight of the goods for light colors, to six per cent for dark colors, the total weight of color for this purpose being from five to twenty times the amount used for silk tinting. As a general rule, mordants and fixers are not required with substantive or direct colors.

The composition is prepared as follows:— All of the components except the color, are put into a suitable grinding and mixing mill, (for example an Abbe pebble mill) and ground and mixed for from fifteen to twenty minutes, or longer with larger quantities, until the mass is reduced to an impalpable powder. The color is then added, and the mass again ground and mixed for another fifteen or twenty minutes, or until a perfectly homogeneous mixture is obtained, as shown by microscopic examination. A small quantity of water is then added, and the mass again mixed until the product is uniformly colored and has a color similar to that produced on a piece of white goods when colored with the powder. The mass is then removed from the grinding mill and dessicated (in a drying oven if necessary). The dried powder is then put in moisture-proof containers and sealed, after which it is ready for the market.

For use, to a quantity of hot water at the approximate temperatures given, sufficient to cover the loosely placed articles in a preferably glazed vessel, is added the dye composition in the proportions above noted, which will vary with the depth of the tint, and thoroughly dissolved by stirring. After complete solution has occurred, the article to be dyed is wet with hot water, and the excess of water squeezed out, the damp article is then loosely immersed in the dye bath, and stirred, or worked about so that the dye solution will have equal access to all portions of the fabric. After a desired shade has been acquired, the fabric is removed and washed, then dried.

I claim—

1. A composition for dyeing comprising a finely divided mixture of a color, a mordant, a leveller, a fixing agent, and a filler consisting of a sugar of animal origin.

2. A composition for dyeing comprising a finely divided mixture of a color, a mordant, a leveller, a fixing agent, and a filler consisting of a sugar of animal origin, the color being supported upon the surfaces of the remaining components.

3. A composition for dyeing comprising a finely divided mixture of a color, a normally solid organic acid, a mordant, a leveller, a fixing agent to increase the union of the mordant with the fibre to be dyed, and an inert organic filler consisting of a sugar of animal origin.

4. A composition for dyeing comprising a finely divided mixture of a color, a normally solid organic acid, a mordant, a leveller, sodium bicarbonate, and lactose.

5. A composition for dyeing comprising a finely divided mixture of a color, tartaric acid, sodium sulphate, aluminum sulphate, sodium bicarbonate, and lactose.

6. A composition for dyeing comprising a finely divided mixture of color, 1 to 5 grains; tartaric acid, 5 to 30 grains; sodium sulphate 15 to 60 grains, sodium bicarbonate 30 to 60 grains, and lactose 60 to 120 grains.

7. The method of making a dye composition, which comprises grinding to a fine state of subdivision a mixture containing a normally solid organic acid, a mordant, a leveller, a fixing agent, and a filler consisting of a sugar of animal origin, and then distributing the color uniformly over the surfaces of the particles of the finely ground mixture.

8. The method of making a dye composition, which comprises grinding to a fine state of subdivision a mixture containing a normally solid organic acid, a mordant, a leveller, sodium bicarbonate, and lactose, then adding a suitable color, and regrinding the mass to distribute the color over the surfaces of the particles of the remaining components, and drying the finished composition.

In testimony whereof I hereby affix my signature.

BARTHOLOMEW C. LEONARDI.